United States Patent
Phillip et al.

(10) Patent No.: US 7,770,735 B2
(45) Date of Patent: Aug. 10, 2010

(54) MAGNETIC SEPARATION PROCESS FOR TRONA

(75) Inventors: James D. Phillip, Green River, WY (US); William E. Stuble, Green River, WY (US); Mike J. Ventura, Green River, WY (US); Donald M. Robertson, Green River, WY (US)

(73) Assignee: Solvay Chemicals Inc., Houston, TX (US)

( * ) Notice: Subject to any disclaimer, the term of this patent is extended or adjusted under 35 U.S.C. 154(b) by 397 days.

(21) Appl. No.: 11/719,706

(22) PCT Filed: Nov. 15, 2005

(86) PCT No.: PCT/EP2005/055990

§ 371 (c)(1),
(2), (4) Date: May 21, 2007

(87) PCT Pub. No.: WO2006/053873

PCT Pub. Date: May 26, 2006

(65) Prior Publication Data

US 2008/0277321 A1    Nov. 13, 2008

Related U.S. Application Data

(63) Continuation-in-part of application No. 10/993,315, filed on Nov. 19, 2004, now Pat. No. 7,473,407.

(51) Int. Cl.
B03C 1/30    (2006.01)

(52) U.S. Cl. .............................. 209/38; 209/3; 209/40; 209/214; 241/20; 423/206.2

(58) Field of Classification Search ................... 209/38, 209/39, 40; 423/206.2; 241/20
See application file for complete search history.

(56) References Cited

U.S. PATENT DOCUMENTS

| 4,206,878 | A | | 6/1980 | Forciea |
| 4,341,744 | A | | 7/1982 | Brison et al. |
| 4,370,225 | A | * | 1/1983 | Bingel et al. .................. 209/40 |
| 4,375,454 | A | * | 3/1983 | Imperto et al. ............ 423/206.2 |
| 5,470,554 | A | * | 11/1995 | Schmidt et al. .......... 423/206.2 |
| 5,911,959 | A | * | 6/1999 | Wold et al. ................ 423/206.2 |
| 6,092,665 | A | * | 7/2000 | Schmidt et al. ................. 209/3 |
| 6,173,840 | B1 | * | 1/2001 | Pruszko et al. .............. 209/214 |
| 6,479,025 | B2 | * | 11/2002 | Denham et al. .......... 423/206.2 |
| 2005/0220687 | A1 | * | 10/2005 | Miller et al. ............. 423/206.2 |
| 2007/0231228 | A1 | * | 10/2007 | Turner et al. ............. 423/206.2 |

* cited by examiner

Primary Examiner—Patrick Mackey
Assistant Examiner—Terrell H Matthews
(74) Attorney, Agent, or Firm—Oblon, Spivak, McClelland, Maier & Neustadt, L.L.P.

(57) ABSTRACT

A process for beneficiation of trona includes supplying a trona feedstream that is crushed and dried. The trona is then separated into a first size fraction and a second size fraction. Impurities are removed from the first size fraction using at least one magnetic separator. The magnetic separator includes a plurality of stages. Each stage includes a conveyer system including a first end, a second end, and a conveyer belt. Each stage also includes a magnetic roller disposed at the second end of the conveyer system and a splitter disposed adjacent the second end of the conveyer system for separating a fraction of magnetic impurities from the trona to create a beneficiated fraction. At least one conveyer belt is deionized. Airborne dust particles are removed from an area surrounding at least one conveyer system.

20 Claims, 3 Drawing Sheets

MAGNETIC SEPARATION PROCESS FOR TRONA

BACKGROUND

Figure 1:
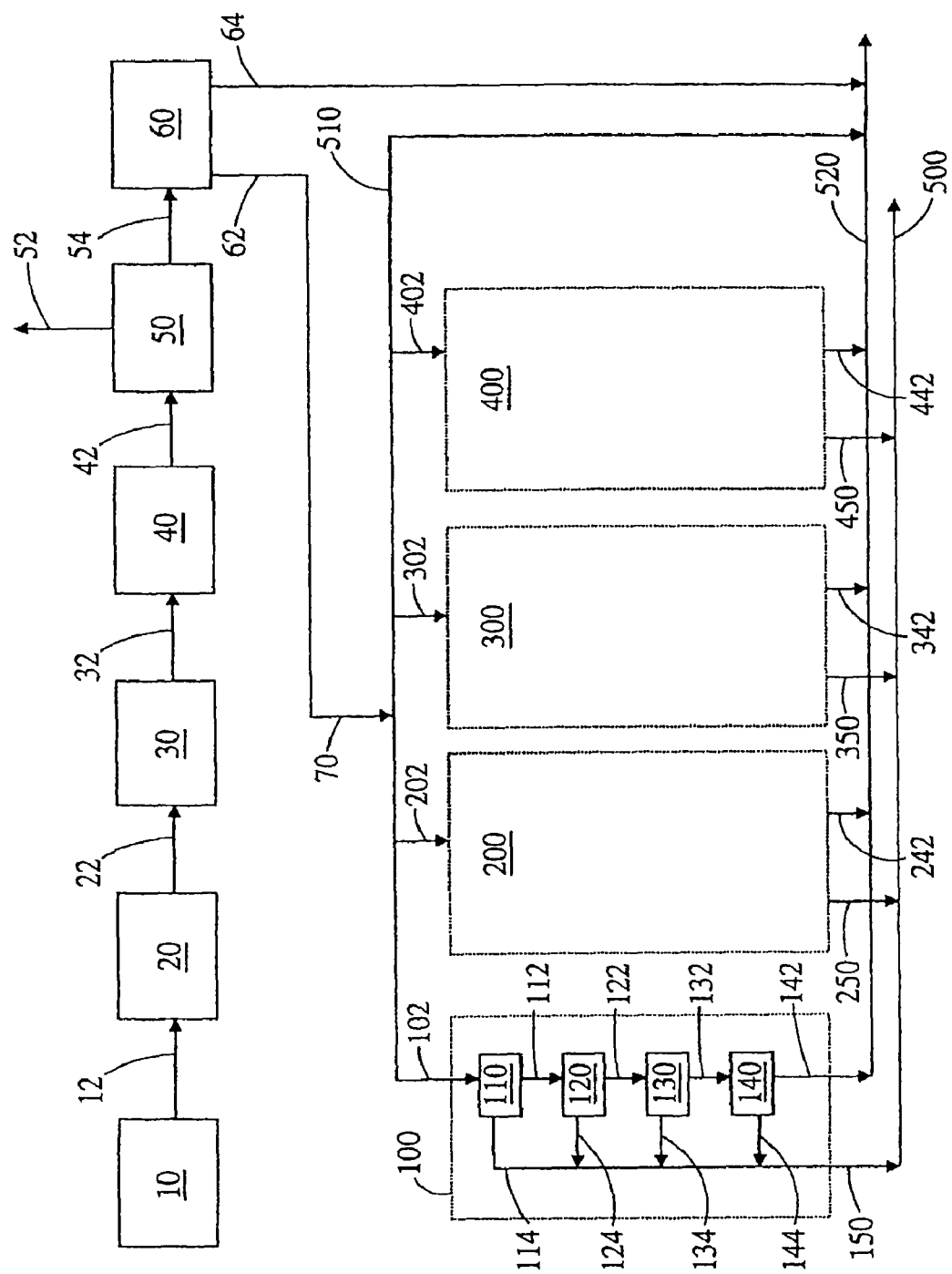
Figure 2:
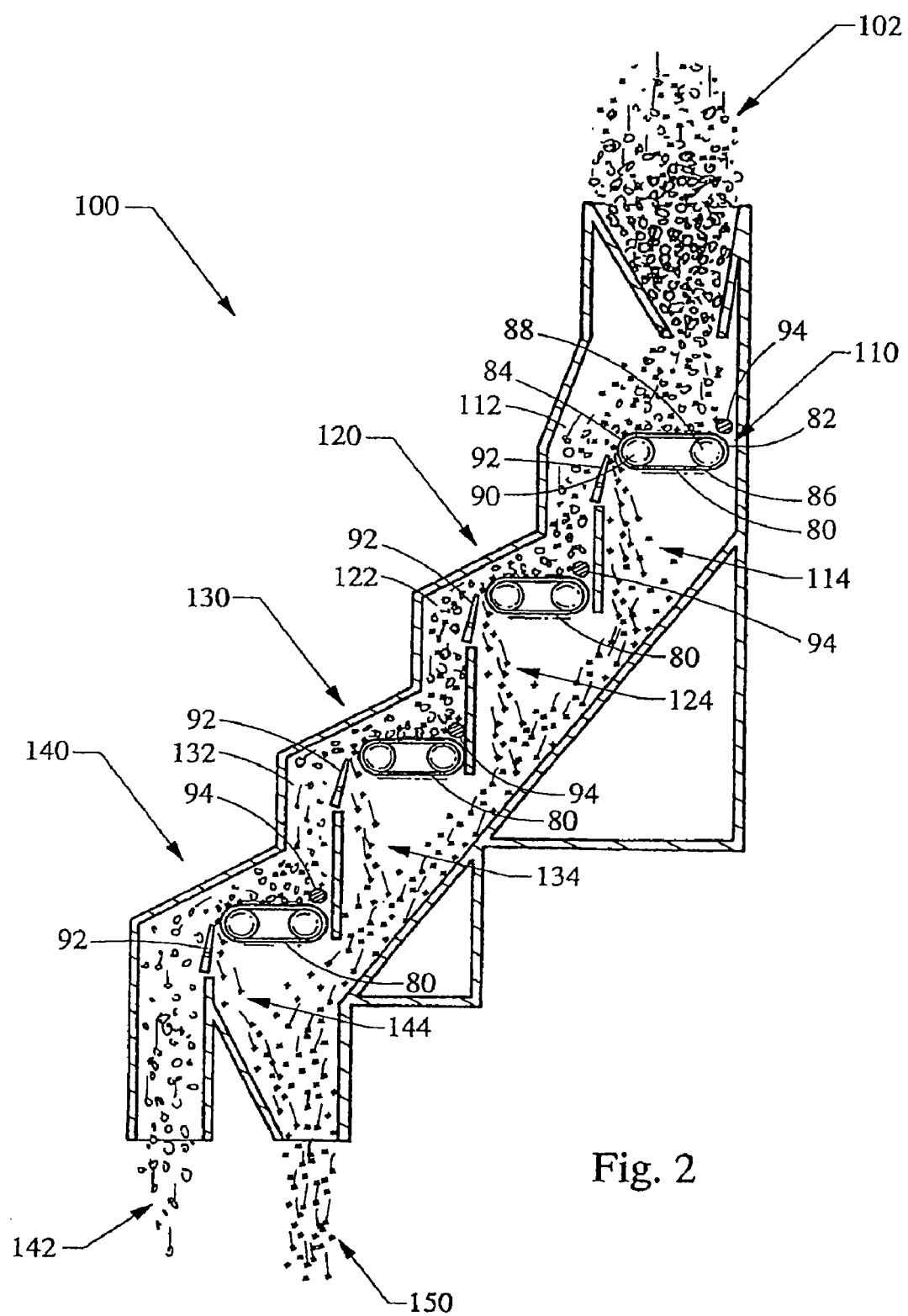
Figure 3:
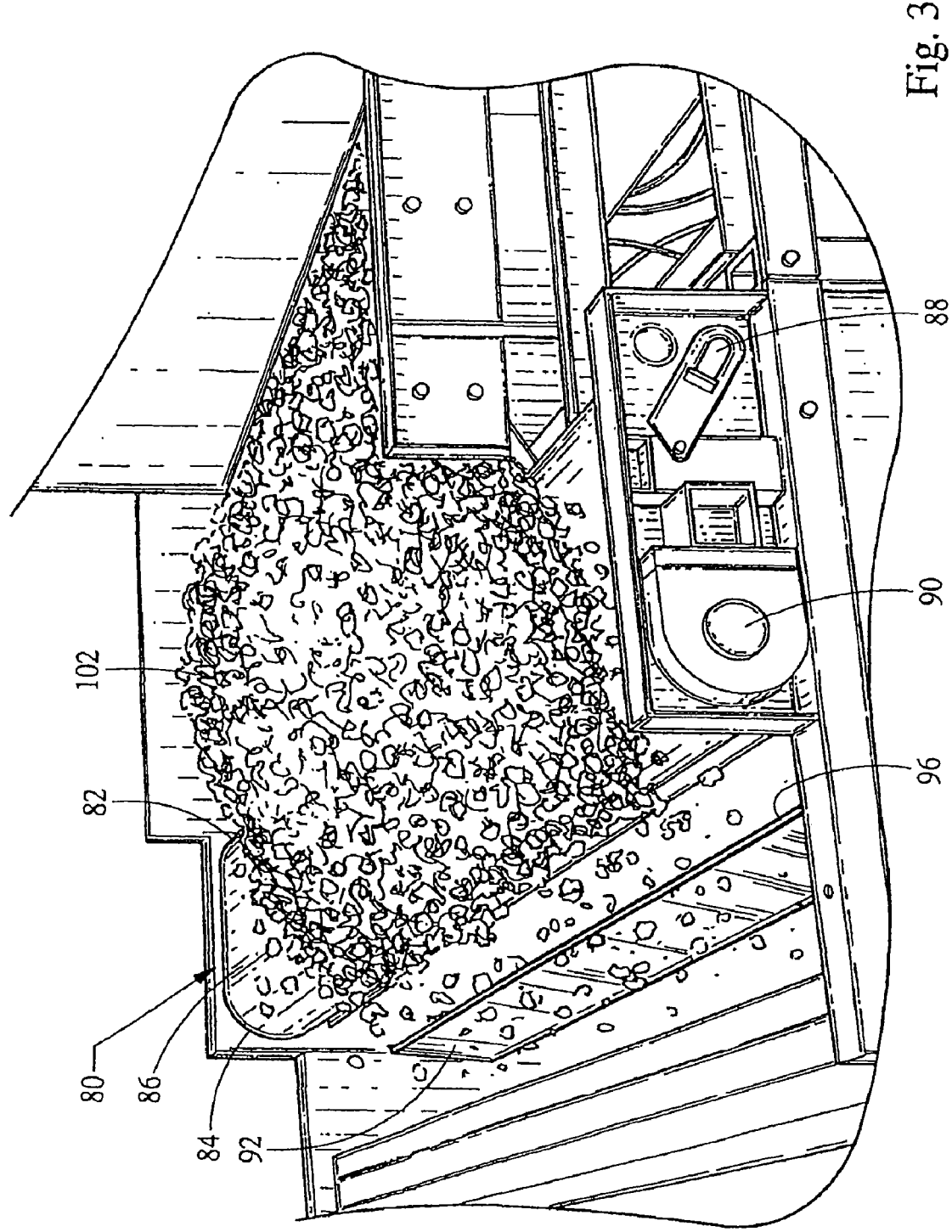

Trona is a mineral that contains about 85-95% sodium sesquicarbonate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl) which covers approximately 2,600 $km^2$. The major trona beds range in size from less than 428 $km^2$ to at least 1,870 $km^2$. By conservative estimates, these major trona beds contain about 75 billion metric tons of ore. The different beds overlap each other and are separated by layers of shale. The quality of the trona varies depending on its particular location in the stratum. Because trona is found contiguous to shale, the trona ore frequently contains shale impurities. Because shale impurities are undesirable in the product, there is a need to develop processing technologies to remove such impurities from trona.

U.S. Pat. No. 5,736,113 to Hazen et al. discloses a process for recovering a high-purity saline mineral from an ore containing the saline mineral, such as trona, and impurities. The process includes separating a first portion of impurities from the trona by an electrostatic separation method at a temperature between about 25° C. and about 45° C. The electrostatic separation methods are based on subjecting the ore to conditions such that materials of different electrical conductivities separate from each other. The process discloses an optional magnetic separation step before or after the electrostatic separation.

U.S. Pat. No. 5,911,959 to Wold et al. discloses a process for the purification of saline minerals having insoluble impurities. The process includes calcining trona to form sodium carbonate, sizing the feedstream into a large size fraction and a small size fraction, separating the large size fraction into a first recovered portion and a first impurity portion by a dry separation method, separating the first impurity portion into a second recovered portion and second impurity portion by a wet separation method, and separating the small size fraction into a third recovered portion and third impurity portion by a wet separation method. The dry separation method may be accomplished by density separation, magnetic separation, or electrostatic separation.

U.S. Pat. No. 6,092,665 to Schmidt et al. discloses a process for recovering a saline mineral from an ore containing the saline mineral and impurities. The process includes the steps of separating a first portion of impurities from the ore by density separation, electrostatically separating a second portion of impurities from the ore, and magnetically separating a third portion of impurities from the ore. In another aspect, the process includes the steps of calcining the ore and subsequently separating a first portion of impurities by density separation.

Equipment for separating magnetic particles from non-magnetic material is known in the art. In particular, Outokumpu Technology, Inc. of Colorado provides a magnetic roll separator. A brochure for the Improsys® Rare-Earth Roll Separator describes the use of a rare earth roll magnet to separate magnetic material from a non-magnetic material. The material to be separated is fed onto a separator belt that moves over the magnetic roll. Magnetic particles are attracted towards the magnetic roll, while nonmagnetic or diamagnetic particles flow unhindered in a trajectory away from the roll. The Outokumpu Technology brochure suggests that the magnetic roll separator can be used in many dry particle applications, including glass and ceramic raw materials (e.g., silica sands, etc.), heavy mineral sands, refractory raw materials, abrasives, fillers, potash salt, phosphate ores and many other materials, including metals, mineral ores and products. This brochure does not describe the use of trona. The brochure describes the optional use of an electrostatic system to prevent dust build-up.

While work has been performed in the beneficiation of trona, there is a need to improve the performance of magnetic separation processes to obtain efficient beneficiation of trona without the additional use of electrostatic precipitation and other separation techniques.

SUMMARY

In one aspect, a process for the beneficiation of trona is provided. A feedstream comprising trona ore is supplied. The trona is crushed and dried. The trona is separated into a first fraction and a second fraction, with the first fraction particles having a larger mesh size than the second fraction particles. The mesh size may be selected such that the second fraction has a level of impurities below a predetermined value. Preferably, the mesh size is selected from 30 mesh to 70 mesh. Impurities are removed from the first fraction using at least one magnetic separator to form beneficiated trona. At least a portion of the second fraction is combined with the magnetically separated first fraction to form the beneficiated trona product. Optionally, a third fraction may be separated from the dried trona, where the third fraction includes particles having a mesh size smaller than the second fraction, and where the third fraction is excluded from the beneficiated trona product. Preferably, the third fraction particles have a mesh size smaller than 100 mesh, 140 mesh, or 200 mesh.

Optionally, the magnetic separator includes a plurality of stages. Each stage preferably includes a conveyer system comprising a first end, a second end, and a conveyer belt. Optionally, each stage also includes a magnetic roller disposed at the second end of the conveyer system and a splitter disposed adjacent the second end of the conveyer system for separating a fraction of magnetic impurities from the trona to create a beneficiated fraction. At least one conveyer belt may be deionized. Airborne dust particles may be removed from an area surrounding at least one conveyer system.

The foregoing paragraphs have been provided by way of general introduction, and are not intended to limit the scope of the following claims. The presently preferred embodiments, together with further advantages, will be best understood by reference to the following detailed description. Numerals have been added to help identification of the components of the process.

DETAILED DESCRIPTION

The relationship and functioning of the various elements of this invention are better understood by the following detailed description. However, the embodiments of this invention as described below are by way of example only.

A process is used to beneficiate trona ore by removing magnetic impurities. The general process includes a mechanical separation process to size the trona ore and a magnetic separation process to remove impurities. In one embodiment the process includes a trona source 10, a crusher 20, a first separator 30, a dryer 40, a second separator 50, a third separator 60, and magnetic separators 100, 200, 300, and 400.

The trona source 10 may be raw trona from a mine or it may be previously processed trona ore. A stream of trona 12 is fed to a crusher 20 and a separator 30. In one embodiment, the separator is a mechanical screener. In a typical separator, the particulate matter is mechanically screened at a certain mesh size, with the portion passing through the screen referred to as smaller than the mesh size and the portion not passing through the screen referred to as larger than the mesh size. Thus, as used herein, the phrase "smaller than a given mesh size" means having a particle size equivalent to the fraction passing through a mechanical screen of the given mesh size, and "larger than a given mesh size" means having a particle size equivalent to the fraction retained by a mechanical screen of the given mesh size. In one embodiment, the separator screens the crushed trona at 11 mesh. The trona may be screened at other mesh sizes, such as 10, 12, 14, 16, or 18 mesh sizes. The portion 32 smaller than the mesh size of separator 30 is then dried.

In one embodiment, the portion 32 is dried in a gas-fired fluid bed dryer 40. The incoming air temperature may be greater than about 500° F., preferably greater than about 600° F. In one embodiment, the portion 32 is dried at a trona particle temperature of less than about 110° F. The residence time of the trona in the drier is between about 1 min and about 5 min, preferably about 3 min. Drying the trona helps to prevent it from clumping and also improves the efficiency of the separation steps.

After drying, the trona stream is separated at stage 50 into a first size fraction 54 and a second size fraction 52. The separation may be accomplished by a mechanical screening process. The mesh size of separator 50 may be selected as 100 mesh, 140 mesh, or 200 mesh. The resulting first size fraction is larger than 100 mesh, 140 mesh, or 200 mesh, respectively. The trona fraction 54 larger than the mesh size is the fraction which is beneficiated. The fraction 52 smaller than the mesh size may be used as another product.

The drying step 40 and separation step 50 may be combined into a single process. In this embodiment, a fluid bed dryer also acts as a particle separator. A small particle size fraction 52 is collected from the air exiting the fluid bed dryer. The air velocity of the fluid bed dryer may be adjusted to control the size of the collected particle size fraction. As the air velocity increases, the size of the particle fraction 52 also increases. The particle size fraction 52 may be smaller than a nominal mesh size of 100 mesh, 140 mesh, or 200 mesh.

In one embodiment, the first size fraction 54 is subjected to a second separation process 60. The separation may be accomplished by a mechanical screening process. The second separation process 60 removes a small particle size fraction or fines 64 from stream 54. The separator mesh size may be selected from 30, 40, 50, or 70 mesh size. The size of the separator mesh may be adjusted so that fines 64 have a predetermined purity level of sodium sesquicarbonate. The fines 64 are then added to the product stream 520. The size fraction 62 larger than the mesh size becomes the feed 70 for the magnetic separators.

Depending on whether the process includes a second separation process 60, the feed steam 70 to the magnetic separators is either the first size fraction 54 or the larger size fraction 62 from the second separator 60.

In one embodiment the feed stream 70 is divided into between one and four streams 102, 202, 302, and 402 to feed magnetic separators 100, 200, 300, and 400. The number of streams depends on the capacity of the individual magnetic separators and the desired production rate for the overall process. Each magnetic separator is preferably a multi-stage magnetic roll separation process. The magnetic separators generally operate at normal ambient conditions (atmospheric pressure and temperature between 40° F. and 110° F.). In one embodiment, the magnetic separators operate at ambient conditions of about 70° F.

Each step of the magnetic separator subjects the trona ore to conditions such that materials of different magnetic susceptibility separate from each other into a beneficiated fraction and an impurities fraction. The magnetic separation step is accomplished by a rare earth magnetic separation method. With regard to the beneficiation of trona, typical impurities can be removed during the magnetic separation step include shale, which has a higher magnetic susceptibility than trona.

The process may include as few as one or up to four or more magnetic separation stages. Using magnetic separator 100 as an example, the first stage 110 removes a fraction of magnetic impurities 114 from the trona feedstream 102. After the first stage 110, the beneficiated fraction 112 is passed to the second magnetic separation stage 120 for further separation. A fraction of magnetic impurities 114 is sent to a waste stream 150. Similarly, the next stage 120 separates a fraction of magnetic impurities 124 and a beneficiated fraction 122. The beneficiated fraction 122 proceeds to the next stage 130, and the magnetic impurities fraction 124 is sent to a waste stream 150. The next stage 130 separates a magnetic impurities fraction 134 and a beneficiated fraction 132. The beneficiated fraction 132 proceeds to the next stage 140, and the magnetic impurities fraction 134 is sent to a waste stream 150. Finally, stage 140 separates magnetic impurities 144 and a final beneficiated fraction 142. The final beneficiated fraction 142 proceeds to product stream 520, and the magnetic impurities fraction 144 is sent to a waste stream 150.

Each stage of the magnetic separator uses a rare earth roll magnet to separate magnetic material from the non-magnetic material. In one embodiment, the separation is conducted using a four-stage high-force HS10-164:150 magnetic roll separator commercially available from Outokumpu Technology, Inc. of Colorado. In such a four stage magnetic separator 100, a conveyor is used in each stage of the separator to transport the material streams. Each conveyer system includes a first end, a second end, and a conveyer belt. In one embodiment, the material flow rate is between about 2 and about 6 tons/hour, preferably about 3.6 tons/hour, and the rollers are about 1.5 m wide. Other flow rates and roller widths are possible. The flow rates and roller speeds may be adjusted to control the purity and yield of the product. The conveyor belt may be made from graphite coated Kevlar® or polyurethane covered polyester fabric. The conveyer belt loops around a magnetic rare earth roller and a tail pulley.

Material is fed onto the conveyer belt. As the feed material moves through the magnetic field magnetic particles are attracted to the magnetic roller. Depending on the magnetic susceptibility of the particle it either 1) becomes attached to the surface of the belt and is subsequently released as it travels away from the magnetic field; or 2) is drawn toward the belt and its trajectory altered from that of the nonmagnetic particles as they are thrown from the rotating roll. Magnetic material has a greater affinity for the magnetic roll than the nonmagnetic material. Thus, the trajectory of the non-magnetic stream is higher than that of the magnetic stream. A splitter controls the separation of the magnetic and non-magnetic streams. The vertical and horizontal location of the splitter may be adjusted to control the separation to obtain a desired product purity at desirable yields. In one embodiment, the splitter has a knife edge.

In one embodiment, the first stage 110 removes tramp metal from the trona feedstream. Tramp metal is an undesirable impurity and can also damage the conveyer belts of the later stages in the process. For this use, the magnetic field of the magnetic roll 90 is weaker and the conveyer belt is heavier than the other three units to avoid tearing up the conveyer belt.

The feed stream may be split into streams 102, 202, 302, and 402. In various embodiments, the magnetic separation process uses parallel magnetic separators 200, 300, and 400 in addition to separator 100. Magnetic separators 200, 300, 400 operate on the same principles as separator 100. However, the sizes and/or number of stages of separator 100, 200, 300, and 400 may be different. Magnetic separators 200, 300, 400 remove a fraction of impurities, which are fed to impurity streams 250, 350, and 450. Impurity streams 250, 350, and 450 combine with stream 150 to form waste stream 500.

Because the quality of the feed stream 10 and feed stream 70 may vary with time, it may not be necessary for the entire feed stream 70 to undergo magnetic separation. For example, if the purity of product stream 520 is higher than necessary, a trona stream 510 bypasses the magnetic separators and goes directly to the product stream 520. This may allow one or more of magnetic separators 100, 200, 300, and 400 to be bypassed, thus reducing operating costs. Thus, in one embodiment, a stream 510 bypasses the magnetic separators and combines with the beneficiated product stream 520. In one embodiment, the quality of product stream 520 may be monitored, and the flow rate of stream 510 controlled to produce a product at a predetermined weight percentage of sodium sesquicarbonate. If the purity of product stream 520 is higher than necessary, the flow rate of stream 510 is increased. Conversely, if purity of product stream 520 begins to decrease, the flow rate of stream 510 is decreased. This feedback system may be manually or automatically controlled.

The efficiency of the magnetic separation process may be affected by the presence of small particles. In particular, small particles can stick to the conveyer belt, reducing the separation efficiency. Small particles can also create dust which tends to get in the various components of the magnetic separator. A small particle fraction may be removed from the feed stream before the magnetic separator. The smaller particles tend to be relatively pure trona, so they may not need to be subjected to magnetic separation. Furthermore, the smaller particles that end up in the reject streams of the magnetic separators tend to be of higher purity trona, so it is undesirable to discard them as rejects.

At least some of the belts of the separators are equipped with deionizers 94. The deionizers neutralize the static charge on the belts to prevent dust particles from adhering to the belt. The deionizer has a series of pins sticking out of it that make contact with the conveyer belt. The high voltage pins of the deionizer neutralize the static charge on the surfaces of dust particles, so the particles aren't attracted to the conveyer belts. In one embodiment, an ionizing bar from Haug North America Haug (model EI-VS 03.8020.000) is used to deionize the conveyer belt.

The dust particles can be removed from the magnetic separator by a dust collector. The dust collector sucks air out of the magnetic separator to remove dust from the air surrounding the conveyer belts. The dust collectors may be positioned in the housing of the magnetic separator. Each magnetic separator may have one or more dust collectors.

As described above, a variety of process parameters may be adjusted to achieve beneficiated trona product at a predetermined sodium sesquicarbonate purity level. The feed rate to each separator can be individually controlled. A trona stream 510 may be used to bypass the magnetic separators and go directly to the product stream 520. The first size fraction 54 may subjected to a second separation process 60 to removes a small particle size fraction 64, which is then added to the product stream 520. Additionally, the roller speed and splitter position of each individual stage of the magnetic separation process may also be adjusted.

EXPERIMENTAL EXAMPLES

A stream of raw crushed trona was screened at either 11 mesh or 16 mesh. The portion smaller than the mesh size was dried in a gas-fired fluid bed dryer at around 110° F. where −200 mesh size particles were removed. The dried trona was then fed to a magnetic separator. The magnetic separator was a three-stage high-force HS10-164:50 magnetic roll separator commercially available from Outokumpu Technology, Inc. The magnetic rollers were 0.5 m wide and 10 cm in diameter. The rollers of each stage of the magnetic separator were operated at a roll speed of 100 rpm. The feed rate was 2.0 tons per hour, equaling 4.0 tons per hour per meter of magnet width.

Runs 1 through 4, shown in Table 1, used a feed of −11 mesh size trona. A deionizer was positioned adjacent the tail pulley of each conveyer system.

Runs 5 through 7, shown in Table 2, used a feed of −16 mesh size trona. A deionizer was positioned adjacent the tail pulley of the first stage conveyer system, and adjacent both the tail and head pulley in the second stage conveyer system.

TABLE 1

| | % as sodium sesquicarbonate | | | | | |
|---|---|---|---|---|---|---|
| Run | Feed | Product | Total Rejects | 1st Roll Reject | 2nd Roll Reject | reject wt % |
| 1 | 90.0 | 95.6 | 80.0 | 55.4 | 90.1 | 30.3 |
| 2 | 90.0 | 93.2 | 74.5 | 50.4 | 82.5 | 27.5 |
| 3 | 88.0 | 94.9 | 85.0 | 41.6 | 73.4 | 32.9 |
| 4 | 86.2 | 92.1 | 74.0 | 31.5 | 83.4 | 28.3 |

TABLE 2

| | % as sodium sesquicarbonate | | | | | |
|---|---|---|---|---|---|---|
| Run | Feed | Product | Total Rejects | 1st Roll Reject | 2nd Roll Reject | reject wt % |
| 5 | 88.0 | 94.9 | 85.0 | 41.6 | 73.4 | 32.9 |
| 6 | 86.2 | 92.1 | 74.0 | 31.5 | 83.4 | 28.3 |
| 7 | 87.2 | 91.8 | 75.7 | 30.4 | 84.5 | 22.6 |

Tables 1 and 2 show an analysis of the composition (as weight percent sodium sesquicarbonate) of the trona feed, the beneficiated product, the total rejects, and the first and second roll rejects, as well as the rejects as a weight percent of the feed. The weight percent sodium sesquicarbonate was measured using acid/base titration analysis. From Tables 1 and 2 it can be seen that the magnetic separator was effective in beneficiating trona to greater than 90% sodium sesquicarbonate, with a yield in the 70% range.

Table 3 shows the composition of the feed, rejects, and product for Run 4 above, as weight percent sodium sesquicarbonate. Table 4 shows the amount of iron (on a weight basis) as a function of size fraction in the feed, rejects, and product for Run 4 above. It can be seen that the −40 size fraction has a higher purity and lower iron content than the +40 size fraction, and that the iron content tends to decrease with decreasing particle size. Also, the rejects of −40 particle size are relatively high purity sodium sesquicarbonate, so it may be undesirable to discard these rejects. Thus, as described above, it may be beneficial to remove smaller size particles before the magnetic separation step and reintroduce them to the product after the magnetic separation step.

TABLE 3

| Fraction | % sodium sesquicarbonate | | |
|---|---|---|---|
| | Feed | Rejects | Product |
| +12 | — | — | — |
| −12 +16 | 83.93 | 21.55 | 93.15 |
| −16 +20 | 87.97 | 41.42 | 92.30 |
| −20 +30 | 87.49 | 62.59 | 95.63 |
| −30 +40 | 88.39 | 78.81 | 96.00 |
| −40 +50 | 90.37 | 85.46 | 96.24 |
| −50 +70 | 92.26 | 90.17 | 96.83 |
| −70 +100 | 94.41 | 93.60 | 95.52 |
| −100 +140 | 97.28 | 96.53 | 97.23 |
| −140 +200 | 99.30 | 98.04 | — |
| −200 | — | — | — |

TABLE 4

| Fraction | Feed ppm Fe | Rejects ppm Fe | Product ppm Fe |
|---|---|---|---|
| +12 | — | — | — |
| −12 +16 | 320.4 | 1644 | 237.2 |
| −16 +20 | 469.7 | 1325 | 180.7 |
| −20 +30 | 389.2 | 949.3 | 119.2 |
| −30 +40 | 364.9 | 668.8 | 93.26 |
| −40 +50 | 324.7 | 481.9 | 78.78 |
| −50 +70 | 288.5 | 337.9 | 60.39 |
| −70 +100 | 195.9 | 197.3 | 48.70 |
| −100 +140 | 112.5 | 107.4 | 45.86 |
| −140 +200 | 74.52 | 71.8 | — |
| −200 | — | — | — |

The embodiments described above and shown herein are illustrative and not restrictive. The scope of the invention is indicated by the claims rather than by the foregoing description. The invention may be embodied in other specific forms without departing from the spirit of the invention.

The invention claimed is:

1. A process for the beneficiation of trona comprising:
supplying a feedstream comprising trona;
crushing the trona;
drying the trona into dried trona that is substantially non-calcined;
separating the dried trona into a first fraction and a second fraction, the first fraction having a nominal mesh size larger than the nominal mesh size of the second fraction;
introducing the first fraction of trona into at least one magnetic separator to remove magnetic impurities and create a beneficiated trona product; and
combining the second fraction of trona with the beneficiated trona product,
wherein the dried trona contains about 85-95% of sodium sesquicarbonate ($Na_2CO_3 \cdot NaHCO_3 \cdot 2H_2O$).

2. The process of claim 1 wherein crushing the trona comprises crushing the trona to a size of less than about 11 mesh.

3. The process of claim 1 wherein the first size fraction is larger than about 40 mesh size and the second size fraction is smaller than about 40 mesh size.

4. The process of claim 1 wherein the separating step further comprises selecting a nominal mesh size such that the second fraction of trona has a level of impurities below a predetermined value.

5. The process of claim 4 wherein the nominal mesh size is selected from a size from 30 mesh to 70 mesh.

6. The process of claim 1 further comprising separating the dried trona into a third fraction, wherein the third fraction is smaller than 100 mesh size, and the third fraction is excluded from the beneficiated trona product.

7. The process of claim 1 wherein the trona is dried at a trona particle temperature of less than about 110° F.

8. A process for the beneficiation of trona comprising:
supplying a feedstream comprising trona;
crushing the trona;
drying the trona into dried trona that is substantially non-calcined;
separating the dried trona into a first fraction and a second fraction, the first fraction having a nominal mesh size larger than the nominal mesh size of the second fraction;
introducing the first fraction to at least one magnetic separator to remove magnetic impurities, wherein the magnetic separator comprises at least two stages in series, each stage comprising:
a conveyer system comprising a first end, a second end, and a conveyer belt;
a magnetic roller disposed at the second end of the conveyer system; and
a splitter disposed adjacent the second end of the conveyer system for separating a fraction of magnetic impurities from the trona to create a beneficiated fraction, wherein the beneficiated fraction from the first stage is fed to the second stage;
deionizing at least one conveyer belt; and
removing airborne dust particles from an area surrounding at least one conveyer system;
wherein the splitter has a knife-edge and is adjustable in position, and
wherein the dried trona contains about 85-95% of sodium sesquicarbonate ($Na_2CO_3 \cdot NaHCO_3 \cdot 2H_2O$).

9. A process for the beneficiation of trona comprising:
supplying a feedstream comprising trona;
crushing the trona;
drying the trona into dried trona that is substantially non-calcined;
separating the dried trona into a first fraction and a second fraction, the first fraction having a nominal mesh size larger than the nominal mesh size of the second fraction;
introducing the first fraction to at least one magnetic separator to remove magnetic impurities, wherein the magnetic separator comprises at least two stages in series, each stage comprising:
a conveyer system comprising a first end, a second end, and a conveyer belt;
a magnetic roller disposed at the second end of the conveyer system; and
a splitter disposed adjacent the second end of the conveyer system for separating a fraction of magnetic impurities from the trona to create a beneficiated fraction, wherein the beneficiated fraction from the first stage is fed to the second stage;
deionizing at least one conveyer belt;
removing airborne dust particles from an area surrounding at least one conveyer system;
separating a small size portion of the first fraction of trona before introducing the first fraction to the magnetic separator and combining at least some of the separated small size portion with the beneficiated trona to obtain a beneficiated trona product having at least a predetermined weight percent of sodium sesquicarbonate,
wherein the dried trona contains about 85-95% of sodium sesquicarbonate ($Na_2CO_3 \cdot NaHCO_3 \cdot 2H_2O$).

10. The process of claim 1, wherein the at least one magnetic separator comprises a plurality of magnetic separators arranged in parallel with each other.

11. The process of claim 8, wherein the at least one magnetic separator comprises a plurality of magnetic separators arranged in parallel with each other.

12. The process of claim 9, wherein the at least one magnetic separator comprises a plurality of magnetic separators arranged in parallel with each other.

13. The process of claim 1, wherein the drying comprises exposing the crushed trona to a heated atmosphere for at least 1 minute, but no more than 5 minutes, such that a particle temperature of the dried trona reaches no more than 110° F.

14. The process of claim 13, wherein the drying in the heated atmosphere occurs simultaneously with separating.

15. The process of claim 14, further comprising adjusting an air velocity in the dryer to control a size of particle separated into the first fraction.

16. The process of claim 8, wherein the drying comprises exposing the crushed trona to a heated atmosphere for at least 1 minute, but no more than 5 minutes, such that a particle temperature of the dried trona reaches no more than 110° F.

17. The process of claim 16, wherein the drying in the heated atmosphere occurs simultaneously with separating.

18. A process for the beneficiation of trona comprising:
supplying a feedstream comprising trona;
crushing the trona;
drying the trona into dried trona that is substantially non-calcined;
separating the dried trona into a first fraction and a second fraction, the first fraction having a nominal mesh size larger than the nominal mesh size of the second fraction;
introducing the first fraction of trona into at least one magnetic separator to remove magnetic impurities and create a beneficiated trona product; and
combining the second fraction of trona with the beneficiated trona product,
wherein the trona is dried at a trona particle temperature of less than about 110° F.

19. A process for the beneficiation of trona comprising:
supplying a feedstream comprising trona;
crushing the trona;
drying the trona into dried trona that is substantially non-calcined;
separating the dried trona into a first fraction and a second fraction, the first fraction having a nominal mesh size larger than the nominal mesh size of the second fraction;
introducing the first fraction to at least one magnetic separator to remove magnetic impurities, wherein the magnetic separator comprises at least two stages in series, each stage comprising:
a conveyer system comprising a first end, a second end, and a conveyer belt;
a magnetic roller disposed at the second end of the conveyer system; and
a splitter disposed adjacent the second end of the conveyer system for separating a fraction of magnetic impurities from the trona to create a beneficiated fraction, wherein the beneficiated fraction from the first stage is fed to the second stage;
deionizing at least one conveyer belt; and
removing airborne dust particles from an area surrounding at least one conveyer system;
wherein the splitter has a knife-edge and is adjustable in position,
wherein the trona is dried at a trona particle temperature of less than about 110° F.

20. A process for the beneficiation of trona comprising:
supplying a feedstream comprising trona;
crushing the trona;
drying the trona into dried trona that is substantially non-calcined;
separating the dried trona into a first fraction and a second fraction, the first fraction having a nominal mesh size larger than the nominal mesh size of the second fraction;
introducing the first fraction to at least one magnetic separator to remove magnetic impurities, wherein the magnetic separator comprises at least two stages in series, each stage comprising:
a conveyer system comprising a first end, a second end, and a conveyer belt;
a magnetic roller disposed at the second end of the conveyer system; and
a splitter disposed adjacent the second end of the conveyer system for separating a fraction of magnetic impurities from the trona to create a beneficiated fraction, wherein the beneficiated fraction from the first stage is fed to the second stage;
deionizing at least one conveyer belt;
removing airborne dust particles from an area surrounding at least one conveyer system;
separating a small size portion of the first fraction of trona before introducing the first fraction to the magnetic separator and combining at least some of the separated small size portion with the beneficiated trona to obtain a beneficiated trona product having at least a predetermined weight percent of sodium sesquicarbonate,
wherein the trona is dried at a trona particle temperature of less than about 110° F.

* * * * *